US012794740B1

(12) United States Patent
Jia et al.

(10) Patent No.: US 12,794,740 B1
(45) Date of Patent: Nov. 10, 2026

(54) DECODING OPTIMIZATION METHOD AND ASSOCIATED SIGNAL PROCESSOR

(71) Applicant: CABLE TELEVISION LABORATORIES, INC., Louisville, CO (US)

(72) Inventors: Zhensheng Jia, Superior, CO (US); Haipeng Zhang, Boulder, CO (US); Qun Zhang, Mankato, MN (US)

(73) Assignee: Cable Television Laboratories, Inc., Louisville, CO (US)

(*) Notice: Subject to any disclaimer, the term of this patent is extended or adjusted under 35 U.S.C. 154(b) by 58 days.

(21) Appl. No.: 18/925,992

(22) Filed: Oct. 24, 2024

Related U.S. Application Data

(60) Provisional application No. 63/545,450, filed on Oct. 24, 2023.

(51) Int. Cl.
*H04L 25/03* (2006.01)
*H04L 1/00* (2006.01)

(52) U.S. Cl.
CPC ...... *H04L 25/03057* (2013.01); *H04L 1/0045* (2013.01)

(58) Field of Classification Search
CPC ......... H04L 25/03885; H04L 25/03146; H04L 1/0076; H04L 1/0041; H04B 10/40; H04B 10/6162; H04B 10/6161
USPC .......................................................... 375/333
See application file for complete search history.

(56) References Cited

U.S. PATENT DOCUMENTS

| | | | | |
|---|---|---|---|---|
| 10,135,645 | B1 * | 11/2018 | Mazzini | H04L 25/03057 |
| 2002/0181573 | A1 * | 12/2002 | Dohmen | H04L 25/063 375/232 |
| 2015/0363247 | A1 * | 12/2015 | Bisplinghoff | H03M 13/612 714/704 |
| 2022/0116120 | A1 * | 4/2022 | Hueda | H04L 7/0029 |
| 2022/0123860 | A1 * | 4/2022 | Brueggen | H04L 1/0061 |
| 2023/0094919 | A1 * | 3/2023 | Wu | H04L 1/0003 375/227 |

(Continued)

OTHER PUBLICATIONS

Borkowski, et al., "FLCS-PON—A 100 Gbit/s Flexible Passive Optical Network: Concepts and Field Trial," Journal of Lightwave Technology, vol. 39, No. 16, Aug. 15, 2021 (Year: 2021).

(Continued)

*Primary Examiner* — Fitwi Y Hailegiorgis
(74) *Attorney, Agent, or Firm* — Cozen O'Connor

(57) ABSTRACT

A decoding optimization method includes detecting a modulated optical signal to yield a demodulated signal and converting the demodulated signal to a digital signal; equalizing, with a decision-feedback equalizer (DFE) operating a first number of active filter-taps, a first data stream of the digital signal to yield a first equalized data stream; determining, at least in part based on the first number of active filter-taps and a pre-forward error correction (FEC) bit error rate of the first equalized data stream, a subsequent number of active filter-taps of the DFE, the subsequent number differing from the first number that yields a subsequent pre-FEC bit error rate differing from the pre-FEC bit error rate; equalizing, with the DFE operating with the subsequent number of active filter-taps, a subsequent data stream to yield a subsequent equalized data stream; and decoding the subsequent equalized data stream to yield a subsequent decoded data stream.

16 Claims, 8 Drawing Sheets

(56) References Cited

U.S. PATENT DOCUMENTS

2024/0097821 A1* 3/2024 Wang .................... H04L 1/0076

OTHER PUBLICATIONS

Cho, Junho, Winzer, Peter J., "Probabilistic Constellation Shaping for Optical Fiber Communications," Journal of Lightwave Technology, vol. 37, No. 6, Mar. 15, 2019 (Year: 2019).

IEEE Computer Society; "IEEE Standard for Ethernet; Amendment 9: Physical Layer Specifications and Management Parameters for 25 GB/s and 50 GB/s Passive Optical Networks," Developed by the LAN/MAN Standards Committee; IEEE Std. 802.3ca 2020 (Year: 2020).

Van Veen, Doutje, and Houtsma, Vincent, "Strategies for economical next-generation 50G and 100G passive optical networks [Invited]"; Journal of Optical Communications and Networking, vol. 12, No. 1, Jan. 2020 (Year: 2020).

Zhang, Junwen, High-Performance Preamble Design and Upstream Burst-Mode Detection in 100 -GB/s/λ TDM Coherent PON; OFC 2020; OSA 2020.

* cited by examiner

DECODING OPTIMIZATION METHOD AND ASSOCIATED SIGNAL PROCESSOR

CROSS-REFERENCE TO RELATED APPLICATIONS

This application claims priority to U.S. provisional patent application Ser. No. 63/545,450 filed Oct. 24, 2023, the disclosure of which is incorporated herein by reference in its entirety.

BACKGROUND

It is envisioned that 100 Gb/s per wavelength and beyond will be required in the future to meet continuously growing bandwidth demands. Existing intensity modulated optical technologies face the challenges in meeting power budget requirements through achieving high launch power, mitigating fiber dispersion, and finding suitable transmission wavelengths. Meanwhile, coherent optics has moved beyond its long-haul application origins to metro networks and now it has been introduced into access networks over the past decade. The utilization of coherent optics within a passive optical network (PON), known as Coherent PON (CPON), yields numerous advantages by enabling multi-dimensional modulation and coherent detection and DSP techniques to achieve unprecedently high degree of flexibility in terms of transmission distance, split ratio, and the optical access architecture.

In each case, forward error correction (FEC) has become an indispensable element for high-speed PON. The evolution of FEC has seen several advancements over time as shown in FIG. 1. The [Nx25G-EPON]standard has adopted high-performance, hard-decision (HD), low density parity check (LDPC) FEC with a bit error rate (BER) threshold of about $10^{-2}$ and a rate of 0.849 and 9 dB of net coding gain (NCG) while 25G-PON MSA and [GPON-G.HSP] are also utilizing the same mother code of this LDPC FEC. The industry is currently exploring leveraging this LDPC FEC for the CPON to allow only small changes with the existing chip design and the compatible operation across both physical and medial access control (MAC) layers.

SUMMARY OF THE EMBODIMENTS

Embodiments herein include a fixed-point simulation model implementing the LDPC code defined in the IEEE 802.3ca standard. The model is verified against published IEEE 802.3ca results. Using co-optimized DSP and LDPC decoding, we evaluate the performance of this FEC in 100 Gbps CPON systems through extensive simulations and lab experiments. To the best of our knowledge, this represents the first demonstration of an existing PON LDPC code performing error correction for coherent PON.

In a first aspect, decoding optimization method is disclosed. The method includes detecting a modulated optical signal to yield a demodulated signal; and converting the demodulated signal to a digital signal; equalizing, with a decision-feedback equalizer (DFE) operating a first number of active filter-taps, a first data stream of the digital signal to yield a first equalized data stream. The method also includes determining, at least in part based on the first number of active filter-taps and a pre-forward error correction (FEC) bit error rate of the first equalized data stream, a subsequent number of active filter-taps of the DFE, the subsequent number differing from the first number that yields a subsequent pre-FEC bit error rate differing from the pre-FEC bit error rate; equalizing, with the DFE operating with the subsequent number of active filter-taps, a subsequent data stream of the digital signal to yield a subsequent equalized data stream; and decoding the subsequent equalized data stream to yield a subsequent decoded data stream.

In a second aspect, decoding optimization method is disclosed. The method includes: detecting a modulated optical signal to yield a demodulated signal; converting the demodulated signal to a digital signal; and equalizing, with a decision-feedback equalizer (DFE), (i) a first data stream of the digital signal to yield a first equalized data stream and (ii) a subsequent data stream of the digital signal to yield a subsequent equalized data stream. The method also includes decoding the first equalized data stream, in part by quantizing the subsequent equalized data stream, with a clipping level equal to a first clipping level, to yield a first decoded data stream; determining, at least in part based on the first clipping level and a post-FEC bit error rate of the first decoded data stream, a subsequent clipping level of that yields a subsequent bit error rate differing from the post-FEC bit error rate; and decoding the subsequent equalized data stream, in part by quantizing the subsequent equalized data stream, with a clipping level equal to the subsequent clipping level, to yield a subsequent decoded data stream.

In a third aspect, signal processor is disclosed. The signal processor includes a decision-feedback equalizer (DFE), a DFE optimizer, and an FEC decoder. The DFE equalizes a first data stream of a digital signal to yield a first equalized data stream. The DFE optimizer is communicatively coupled to the DFE and that determines, based on a pre-forward error correction (FEC) bit error rate of the first equalized data stream, a subsequent number of active filter-taps of the DFE that yields a subsequent bit error rate differing from the pre-FEC bit error rate. The DFE, when operating with the subsequent number of active filter-taps, equalizes a subsequent data stream of the digital signal to yield a subsequent equalized data stream. The FEC decoder is communicatively coupled to the DFE and decodes the subsequent equalized data stream to yield a subsequent decoded data stream.

In a fourth aspect, a signal processor is disclosed. The signal processor includes a DFE, an FEC decoder, and a decoder optimizer. The DFE that equalizes (i) a first data stream of a digital signal to yield a first equalized data stream and (ii) a subsequent data stream of the digital signal to yield a subsequent equalized data stream. The FEC decoder is communicatively coupled to the DFE and decodes the first equalized data stream to yield a first decoded data stream. The decoder optimizer determines, based on a post-FEC bit error rate of the first decoded data stream, a subsequent clipping level of that yields a subsequent bit error rate differing from the post-FEC bit error rate. The FEC decoder decodes the subsequent equalized data stream in part by quantizing the subsequent equalized data stream, with a clipping level equal to the subsequent clipping level, to yield a subsequent decoded data stream. The DFE may determine, based on a pre-forward error correction (FEC) bit error rate of the first equalized data stream, a subsequent number of active filter-taps of the DFE that yields a subsequent bit error rate differing from the pre-FEC bit error rate; wherein DFE operates with the subsequent number of active filter-taps when equalizing the subsequent data stream.

DETAILED DESCRIPTION OF THE EMBODIMENTS

Simulation Model and Results

The IEEE 802.3ca standard adopts a 12 by 69 proto-graph base matrix with an expansion factor of $z_c$=256. The studied codeword size is 16774, including the 14392 message bits, 200 shortened bits, 3072 parity check bits (PCBs) with 512 of them truncated.

We developed a soft-input-soft-output (SISO) iterative message passing decoder based on usual abstraction of Tanner graph, i.e., each row operation of the parity check matrix represents a single parity check code, and each column operation of the parity check matrix corresponds to a repetition code. Layer-by-Layer decoding is used for faster convergence of the decoding process, and Min-Sum approximation is also used to compute the extrinsic information for each parity check node.

Figure 1:
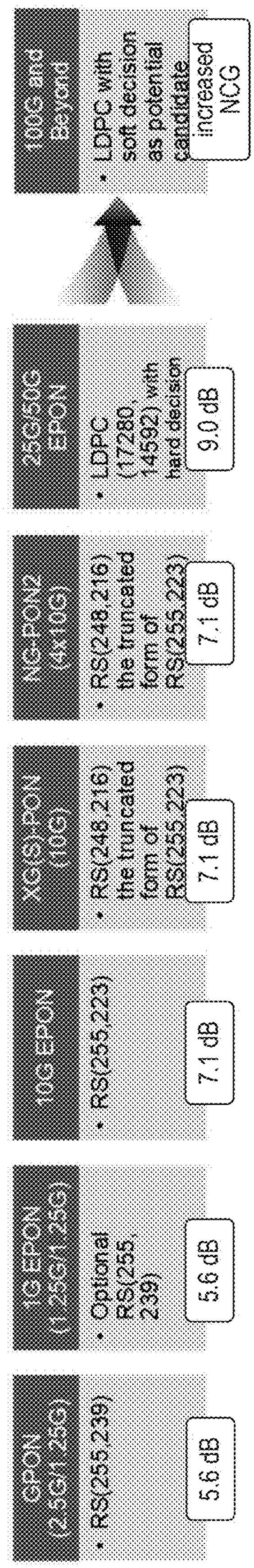
FIG. 1 illustrates the evolution of forward error correction in passive optical networks.
Figure 2:
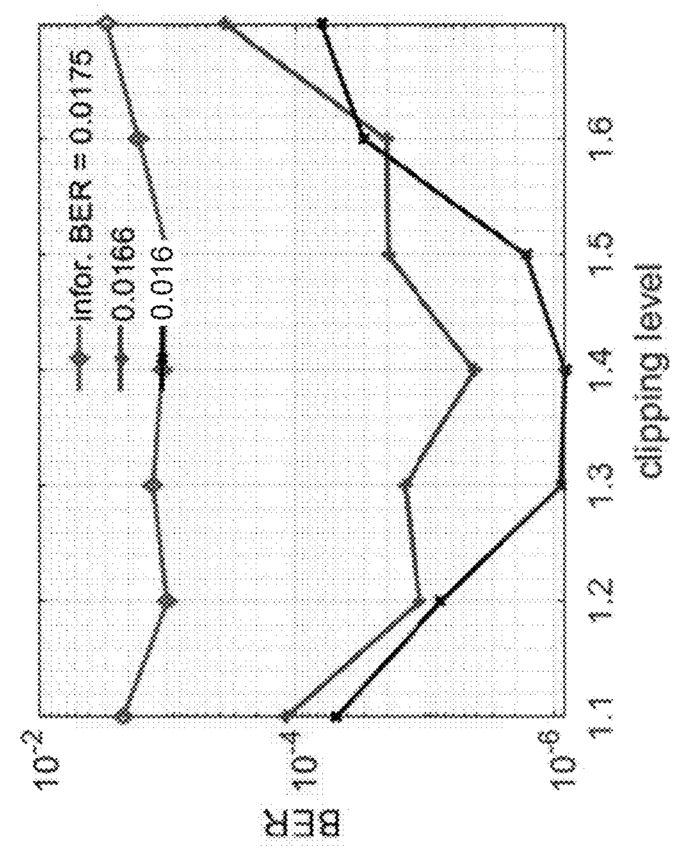
FIGS. 2, 3, and 4 show simulated results of (a) clipping optimization, (b) LDPC output BER vs. uncoded BER, and (c) BER vs. energy per bit to noise power spectral density ratio ($E_b/N_0$), respectively.
Figure 3:
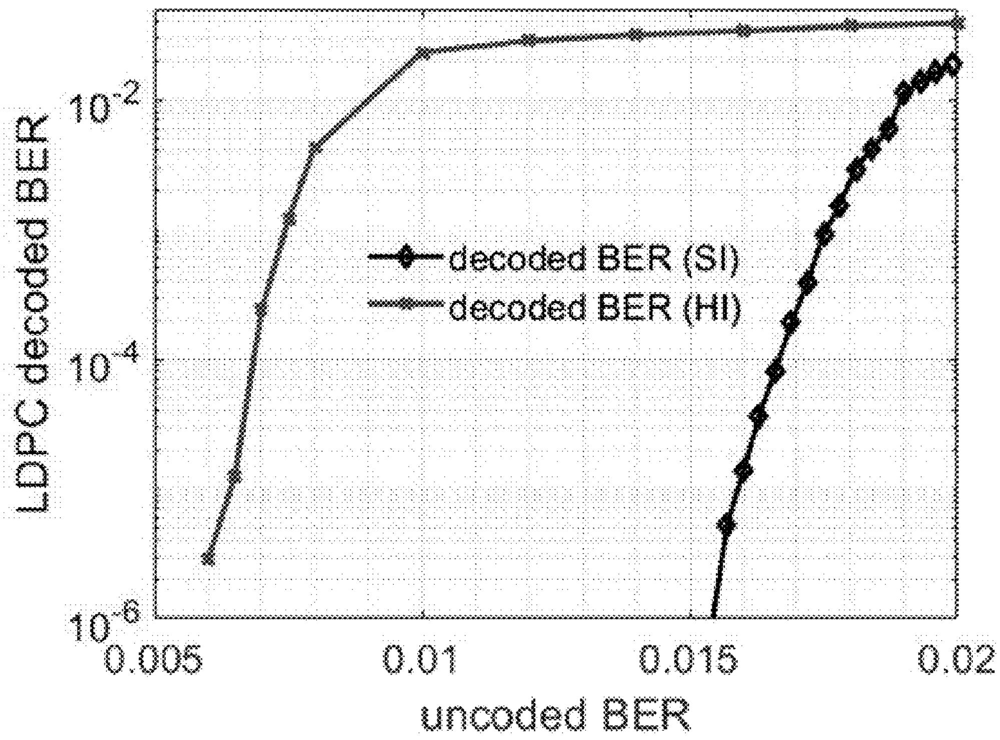
Figure 4:
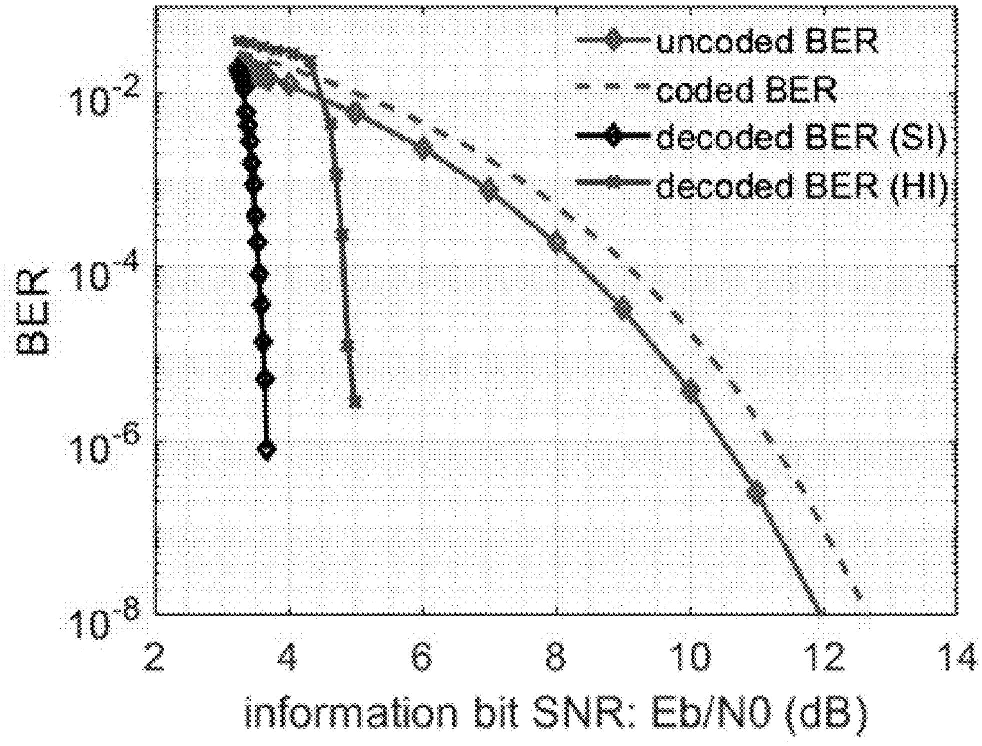

Our simulation-based results with ten decoding iterations are shown in FIGS. 2, 3, and 4. In FIG. 2, we optimized the signal clipping level for the quantization of the soft-input (SI) signal with 6-bit resolution. Note that the information BER is used to indicate the uncoded BER at a standard transmission rate. The coded BER indicates pre-FEC-decoding BER at a higher transmission rate considering the added overhead by FEC coding, assuming the same transmit power. The decoded BER vs. clipping level results in FIG. 2 reveal that 1.4 is a good clipping level minimizing the decoding performance for BPSK with ±1 as the signal levels in a discrete BSC channel model. FIG. 2 shows that clipping optimization can lower the LDPC decoded BER from ~$10^{-4}$ to $10^{-6}$ for the studied range with 6-bit resolution, which may lead to a lower pre-FEC BER threshold.

Based on the findings of the optimal clipping level, simulation results are collected for various signal to noise ratio (SNR) levels and are presented in FIG. 3. In addition to the soft-input case, soft-decision performance with hard-input (HI) are also modeled. The expected performance gap indicates that SI may be the preferred choice for high performance systems. Note that the all the curves in FIG. 4 are plotted against the information bit SNR assuming no coding is used. We also plotted the coded BER curve, which is 10 $\log_{10}(0.8484)=-0.7$ dB away from the uncoded BER curve where the 14392/(14392+2560+10)=0.8484 is the code rate obtained with the transmitted 14392 message bits, 2560 PCBs, and the 10-bit codeword delimiter. In the following example, only the SI decoding is studied.

Lab Measurement and Processing Results

Figure 5:
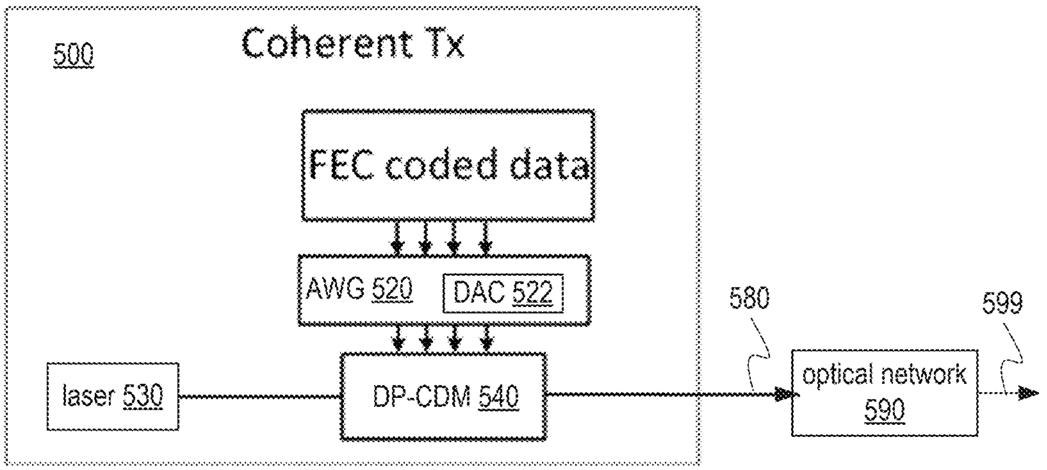
FIG. 5 is a functional block diagram of a transmitter.

FIG. 5 is a functional block diagram of a transmitter 500, which includes an arbitrary waveform generator (AWG) 520, a laser 530, and a dual-polarization coherent driver modulator (DP-CDM) 540, which functions as an electrical-to-optical signal converter. AWG 520 may be an 80-GSa/s four-channel arbitrary waveform generator (AWG) serving as the four-channel signal generator. Laser 530 may be a 1550-nm external cavity laser (ECL) emitting at 15 dBm. Transmitter 500 outputs an optical signal 580 to an optical network 590, which outputs an optical signal 599.

Optical signal 580 may be modulated with standard Dual-Polarization Quadrature Phase-Shift Keying (DP-QPSK) format with LDPC coding. In embodiments, the baud rate of signal 580 remains fixed at 25 GBd. The symbols undergo resampling to align with the 80-GSa/s sampling rate required for a digital-to-analog converter (DAC) 522 of AWG 520.

Figure 6:
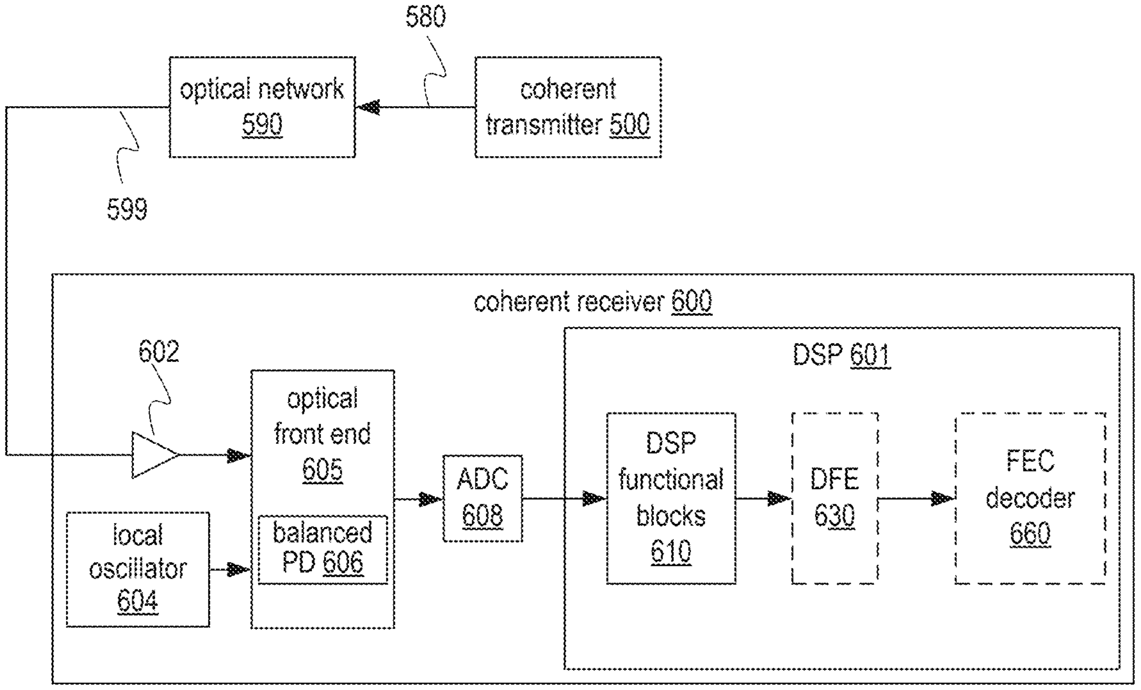
FIG. 6 is a functional block diagram of a coherent receiver that receives an optical signal from the transmitter of FIG. 5 via an optical network, in an embodiment.

FIG. 6 is a functional block diagram of a coherent receiver 600 that receives optical signal 599 from optical network 590. Coherent receiver 600 includes a pre-amplifier 602, a local oscillator 604, an optical front end 605, an analog-to-digital converter (ADC) 606, and a digital signal processor (DSP) 601. Optical front end 605 includes a balanced photodetector 606. Pre-amplifier 602 may be or include an erbium-doped fiber amplifier (EDFA), e.g., to optimize the signal power level for detection.

DSP 601 includes DSP functional blocks 610 and at least one of a decision-feedback equalizer (DFE) 630 and an FEC decoder 660. FEC decoder 660 may be, or implement, a low-density parity check decoder.

At optical front end 605, optical signal 599 is combined with a local oscillator (LO) 604 and subsequently detected by balanced photodetectors 606 within an integrated coherent receiver (ICR). The signals then are directly fed into an optical modulation analyzer with an acquisition rate of 80 GS/s. Subsequently, processing is carried out with standard coherent DSP functional blocks 610. DSP functional blocks 610 may include one or more of the following tasks: clock recovery, chromatic dispersion compensation, polarization mode dispersion compensation through the use of the least-mean-square (LMS) and constant modulus algorithm (CMA), carrier frequency offset estimation, and phase recovery.

In embodiments, the processed baud rate samples are sent to FEC decoder 660 for decoding. One key features of embodiments disclosed herein in the synchronization of the transmitted and the received codeword sequences. To obtain enough data points, a variable optical attenuator is fine tuned to change the received optical power (ROP) in a fraction of a dB scale. Multiple measurements are made to have enough data for decoding.

Figure 7:
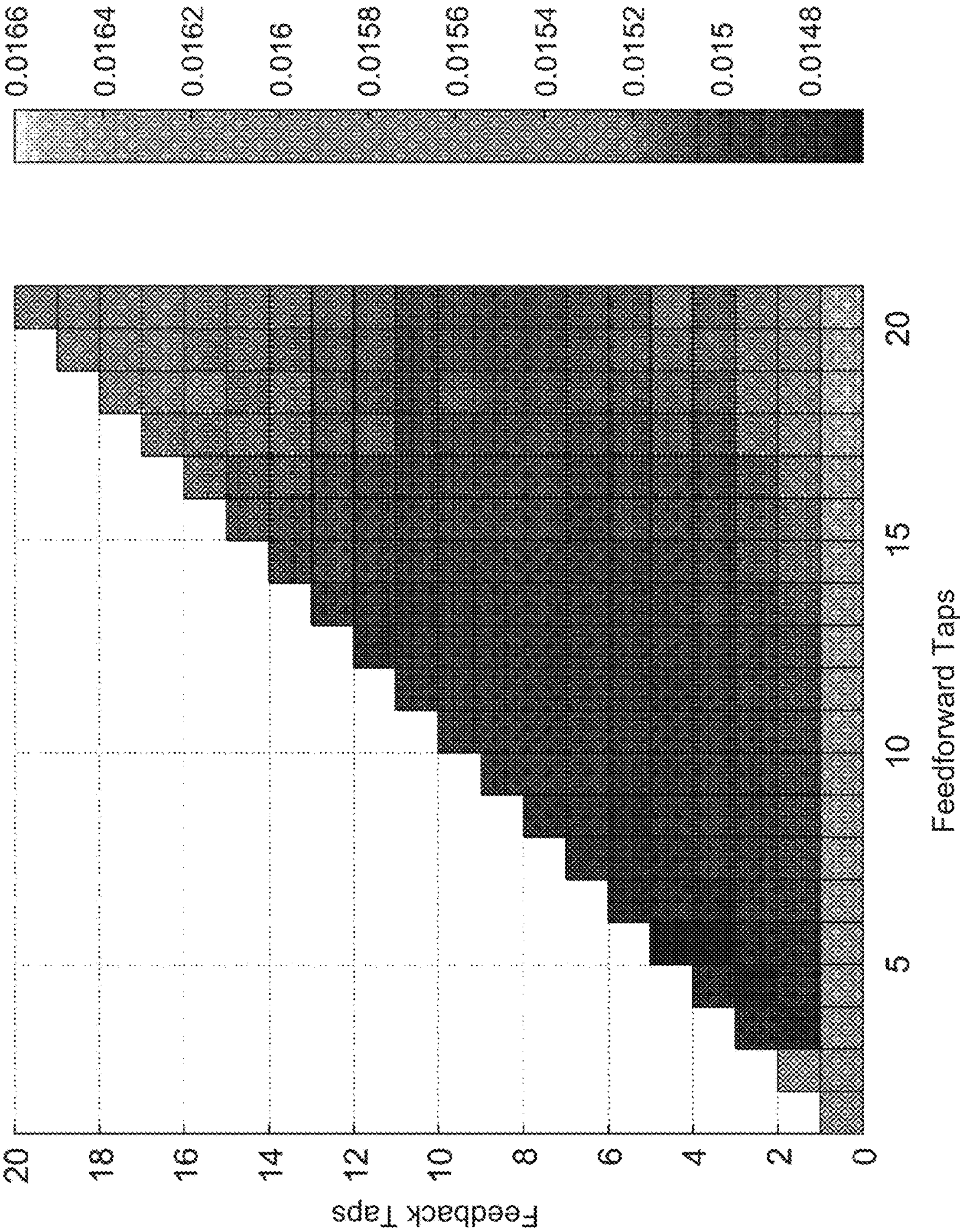
FIG. 7 shows bit-error rate as a function of different numbers of feedback tap and feedforward taps of an embodiment of the coherent receiver of FIG. 6.

DFE 630 may follow the FFE-CMA and phase recovery stages. Register with 6-bit resolution is again used to store the LLR values for the input signal. Clipping optimization, although not shown here, leads to an optimal clipping level at 1.426. We have first optimized the decision feedback equalizer in terms of the number of taps in the feedforward filter (FFF) and feedback filter (FBF). The received optical power used for this study is −41.3 dBm and the results are summarized in FIG. 7, showing that the combination of 4 FFF and 4 FBF taps is the best case in a particular scenario, where the pre FEC $BER_{in}$ is 0.0148. Note that the residual dispersion is already compensated by the bulk CD compensation filter prior to the DFE. As a result, a causal structure is used for the DFE.

Both the cases of with DFE and without (w/o) DFE are studied for the performance evaluation of the LDPC code with SI soft-decision and the same decoder model used in Section 2. Because error propagation can happen when DFE is used and the generated burst error can have a negative impact for the LDPC decoding, we tested LDPC both with and without interleaving. Note that per the IEEE 802.3ca standard, the interleaver and de-interleaver are realized by using 10×256-by-256 Omega networks and reverse Omega networks, for which we implemented in our LDPC programs with a specific random seed used for interleaving/de-interleaving.

Figure 8:
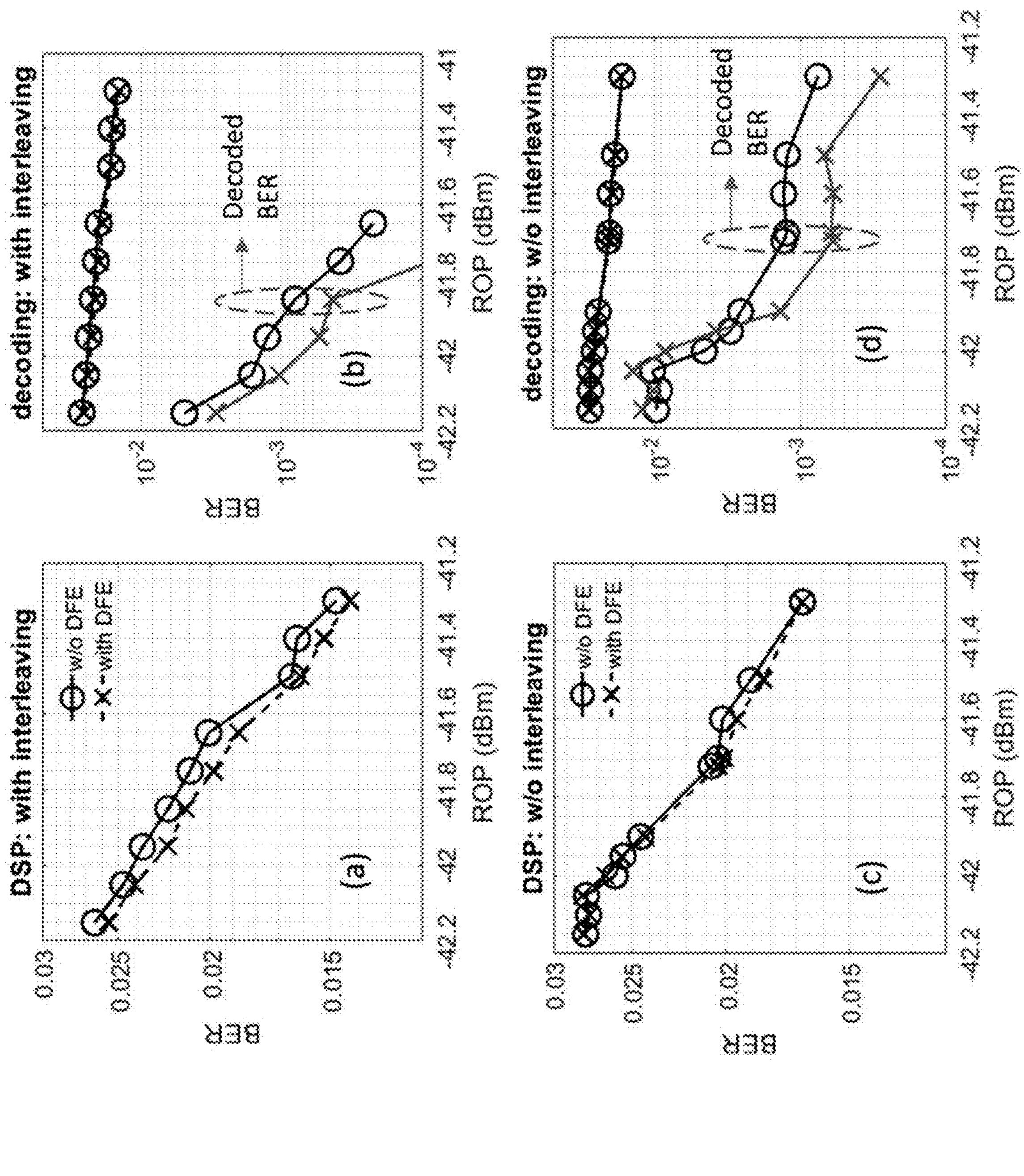
FIG. 8 graphically shows performance of an embodiment of a 100 Gbps CPON FEC coded modulation testbed with BER vs. ROP for LDPC.

As shown in FIGS. 8(*a*) and 8(*c*), for both the interleaving and the no-interleaving cases, the BER performance is better for the case with DFE vs. without DFE, as expected. Comparing FIG. 8(*a*) with FIG. 8(*c*), we found that the BER performance with interleaving is better than without interleaving. This may be caused by the reduction in the correlation among codeword bits.

The LDPC soft-decision decoding performance is summarized in FIGS. 8(*b*) and 8(*d*) for LDPC with and without interleaving, respectively. For comparison purpose, the pre-FEC $BER_{in}$ data from FIGS. 8(*a*) and 8(*c*) are re-plotted in FIGS. 8(*b*) and 8(*d*). As shown by FIG. 8(*b*), the BER performance with DFE is better than the case without DFE, indicating that the error propagation of the DFE is mitigated by the use of interleaving. However, from FIG. 8(*d*) with no interleaving is used, when the received optical power is less than −42 dBm, the case with DFE has a worse BER performance than the case without DFE, indicating the negative impact of burst errors on LDPC decoding.

Figure 9:
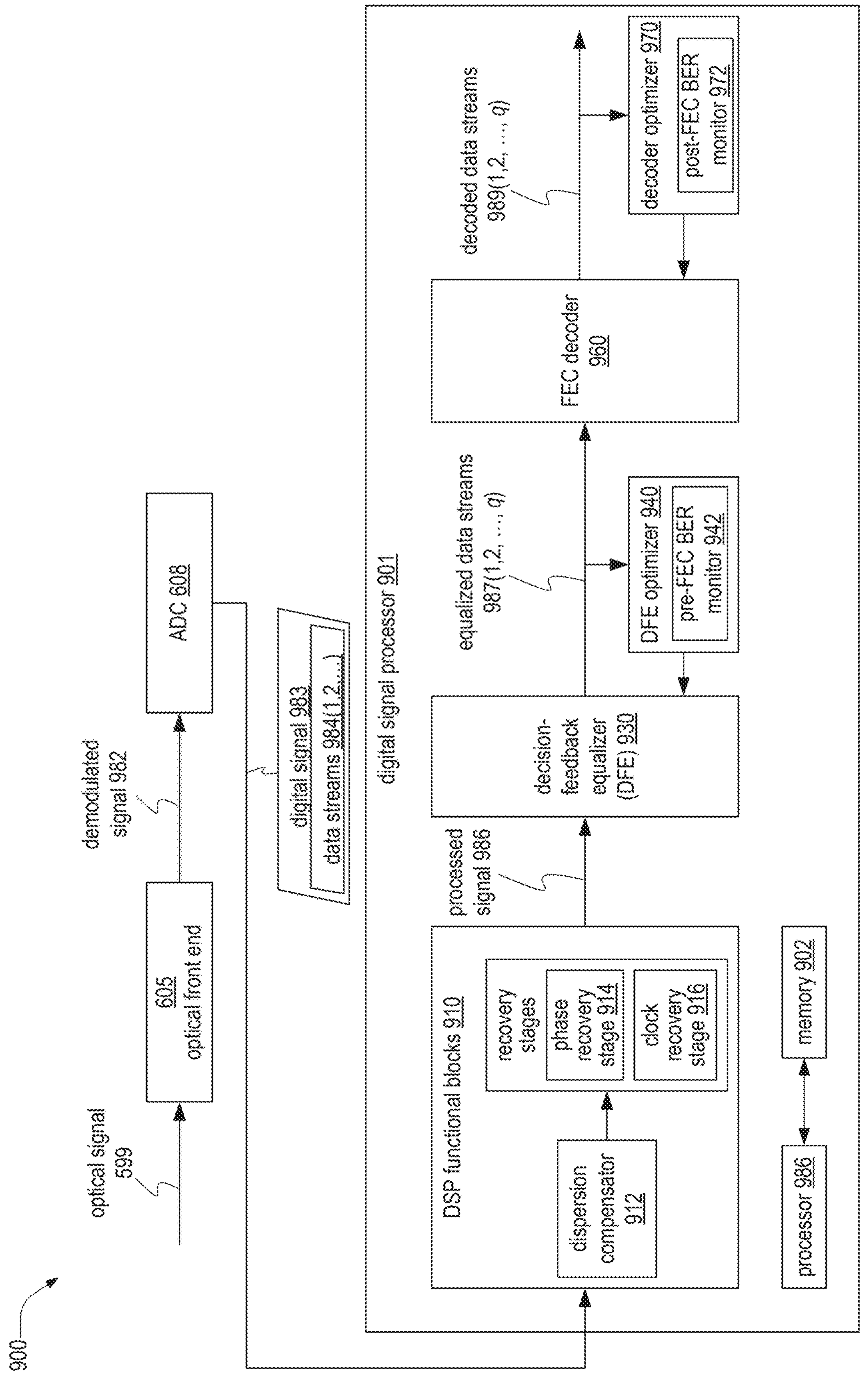
FIG. 9 is a functional block diagram of a coherent receiver, which is an example of the coherent receiver of FIG. 6.

FIG. 9 is a functional block diagram of a coherent receiver 900, which is an example of coherent receiver 600, FIG. 6. Coherent receiver 900 includes optical front end 605, ADC 608, and a DSP 901, which is an example of DSP 601.

DSP 901 may include a processor 986 and a memory 902. Memory 902 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 902 may be integrated into processor 986.

Memory 902 stores software that includes non-transitory machine-readable instructions. In embodiments, the software, when executed by processor 986, causes processor 986 to implement the functionality of DSP 901 as described herein. The software may be, or include, firmware.

Processor 986 represents any type of circuit or integrated circuit capable of performing logic, control, and input/output operations. For example, processor 986 may include one or more of a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC).

DSP 901 includes DSP functional blocks 910 and at least one of a DFE 930, a DFE optimizer 940, an FEC decoder 960, and a decoder optimizer 970. DFE 930 and DEC decoder 960 are respective examples of DFE 630 and DEC decoder 660. DFE optimizer 940 and decoder optimizer 970 include a pre-FEC BER monitor 942 and a post-FEC monitor 972, respectively. DSP functional blocks 910 may include at least one of dispersion compensator 912, phase recovery stage 914 and a clock recovery stage 916.

DFE optimizer 940 and decoder optimizer 970 may be part of, or communicatively coupled to, DFE 930 and FEC decoder 960, respectively. DFE optimizer 940 may include a bit error rate monitor 942 that monitors that pre-FEC bit error rates. Decoder optimizer 970 may include a post-FEC bit error rate monitor 972 that determines the post-FEC bit error rates.

In example modes of operation, optical front end 605 demodulates optical signal 599 and outputs a demodulated signal 982, which ADC 608 converts to a digital signal 983. In embodiments, digital signal 983 has bit resolution of two or greater, and ma include a soft decision message. Digital signal 983 includes data streams 984, such as a first data stream 984(1) and a subsequent data stream 984(*q*), where q is greater than one.

The following describes a first example mode of operation of coherent receiver 900. DFE 930 equalizes first data stream 984(1) to yield a first equalized data stream 987(1). DFE optimizer 940 is communicatively coupled to DFE 930 and determines, based on a pre-forward error correction (FEC) bit error rate of equalized data stream 987(1), a subsequent number of active filter-taps of DFE 930 that yields a subsequent bit error rate differing from the pre-FEC bit error rate. DFE 930, when operating with the subsequent number of active filter-taps, equalizes subsequent data stream 984(*q*) to yield a subsequent equalized data stream 987(*q*). FEC decoder 960 is communicatively coupled to DFE 930 and decodes subsequent equalized data stream 987(*q*) to yield a subsequent decoded data stream 989(*q*).

The following describes a second example mode of operation of coherent receiver 900. DFE 930 equalizes both (i) first data stream 984(1) to yield equalized data stream 987(1) and (ii) subsequent data stream 984(*q*) of the digital signal to yield subsequent equalized data stream 987(*q*). FEC decoder 960 is communicatively coupled to DFE 930 and decodes equalized data stream 987(1) to yield decoded data stream 989(1). A decoder optimizer 970 determines, based on a post-FEC bit error rate of decoded data stream 989(1), a subsequent clipping level of that yields a subsequent bit error rate differing from the post-FEC bit error rate. FEC decoder 960 decodes subsequent equalized data stream 987(*q*) in part by quantizing subsequent equalized data stream 987(*q*), with a clipping level equal to the subsequent clipping level, to yield a subsequent decoded data stream 989(*q*).

Figure 10:
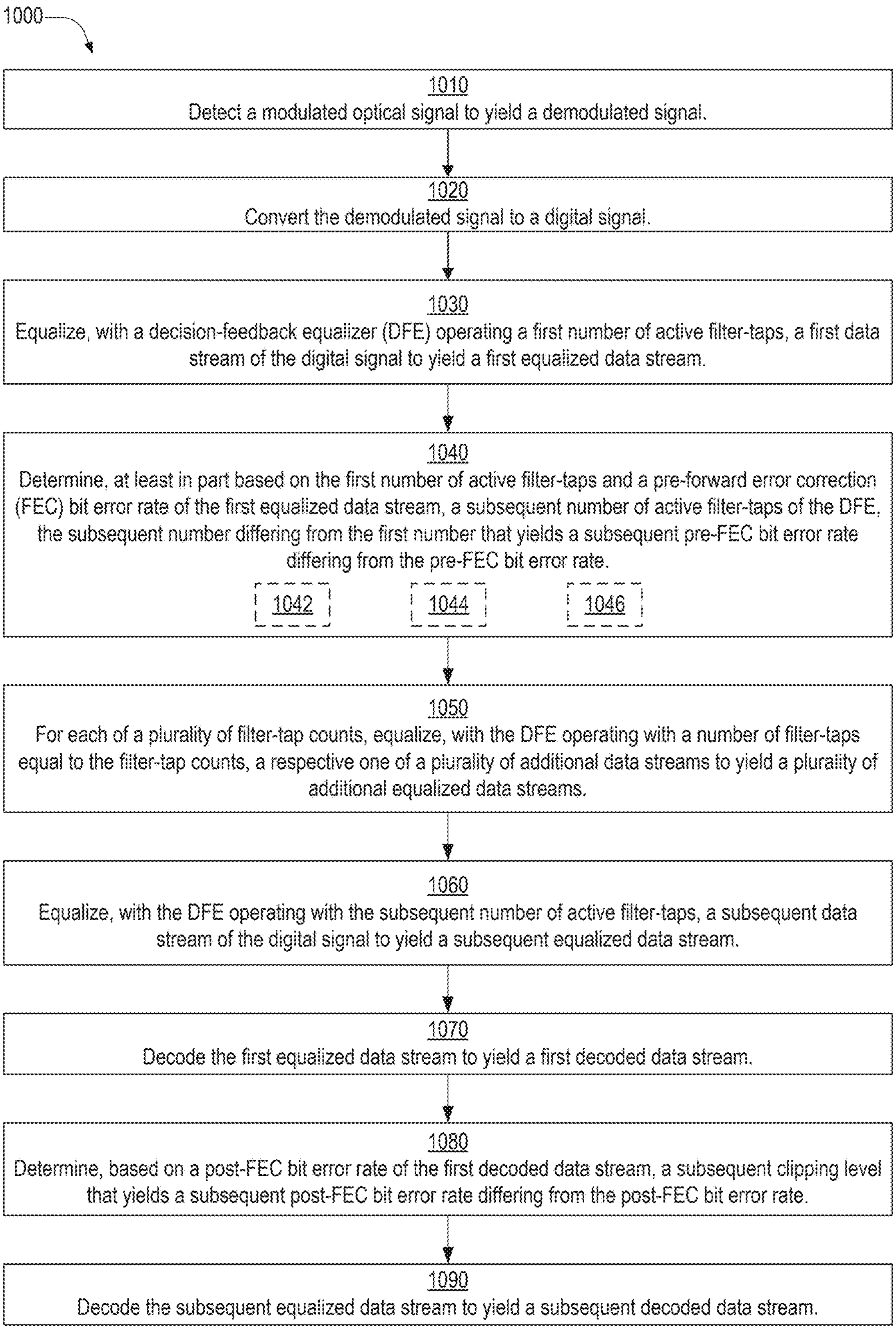
FIGS. 10 and 11 are flowcharts illustrating respective embodiments of decoding optimization methods, each of which may be implemented by the coherent receiver of FIG. 9.

FIG. 10 is a flowchart illustrating a decoding optimization method 1000. In embodiments, method 1000 is implemented within one or more aspects of coherent receiver 900. For example, method 1000 may be implemented by DSP 901. Method 1000 includes at least one of steps 1010, 1020, 1030, 1040, 1050, 1060, 1070, 1080, and 1090.

The following description of method 1000 includes parenthetical numbers following terms recited by the method. The parenthetical number indicates that the element associated with the number in parenthesis is an example of the term. For example, the description of step 1010 below recites "detecting a modulated optical signal (599)," which means that optical signal 599 of FIGS. 5 and 9 is an example of the modulated optical signal introduced in step 1010.

Step 1010 includes detecting a modulated optical signal (599) to yield a demodulated signal (982). Step 1020 includes converting the demodulated signal (982) to a digital signal (983). Step 1030 includes equalizing, with a decision-feedback equalizer (DFE, 930) operating a first number of active filter-taps, a first data stream (984(1)) of the digital signal to yield a first equalized data stream (987(1)).

Step 1040 includes determining, at least in part based on the first number of active filter-taps and a pre-forward error correction (FEC) bit error rate of the first equalized data stream, a subsequent number of active filter-taps of the DFE, the subsequent number differing from the first number that yields a subsequent pre-FEC bit error rate differing from the pre-FEC bit error rate.

Method 1000 may include at least one of steps 1042, 1044, and 1046. Step 1042 includes monitoring the pre-forward error correction (FEC) bit error rate of the first equalized data stream. Step 1044 includes determining at least one of (i) a subsequent number of active feedback filters of the DFE and (ii) a subsequent number of active feedforward filters of the DFE. Step 1046 includes changing the number of active filter-taps of the DFE to equal the subsequent number. Step 1046 may include changing a tap coefficient of a filter-tap of the DFE from either (i) zero to a non-zero value or (ii) a non-zero value to zero. One or more of steps 1042, 1044, and 1046 may be part of step 1040.

The pre-FEC bit error rate may exceed the subsequent pre-FEC bit error rate by a predetermined amount, which may be expressed as a relative difference between the pre-FEC bit error rate and subsequent pre-FEC bit error rate. Example values of this relative difference include 0.5 percent and 1 percent, and values therebetween in 0.1 percentage point increments. Such values may be applicable when pre-FEC BER levels are between 0.01 and 0.02. The subsequent pre-FEC bit error rate may be less than or equal to $10^{-2}$, e.g., when FEC decoder 960 implements hard-decision LDPC FEC decoding, or may be less than or equal to $2.1\times10^{-2}$, e.g., when FEC decoder 960 implements soft-decision LDPC FEC decoding.

In embodiments, method 1000 includes a step 1050, which precedes step 1060. Step 1050 includes, for each of a plurality of filter-tap counts, equalizing, with the DFE (930) operating with a number of filter-taps equal to the filter-tap counts, a respective one of a plurality of additional data streams (984(2, 3, . . . )) to yield a plurality of additional equalized data streams (987(2, 3, . . . )). When method 1000 includes step 1050, step 1040 may include determining the subsequent number of filter-taps based on (i) respective pre-FEC bit error rates of the first equalized data stream and the additional equalized data streams (987) and (ii) the plurality of filter-tap counts. In such embodiments, the determining the subsequent number of active filter-taps (step 1040) includes implementing an optimization algorithm having, as inputs (e.g. input arguments), the respective pre-FEC bit error rates and the plurality of filter-tap counts.

Step 1060 includes equalizing, with the DFE operating with the subsequent number of active filter-taps, a subsequent data stream (984($q$)) of the digital signal to yield a subsequent equalized data stream (987($q$)).

Step 1070 includes decoding the first equalized data stream (987(1)) to yield a first decoded data stream (989(1)). Step 1080 includes determining, based on a post-FEC bit error rate of the first decoded data stream, a subsequent clipping level that yields a subsequent post-FEC bit error rate differing from the post-FEC bit error rate.

The post-FEC bit error rate may exceed the subsequent post-FEC bit error rate by a predetermined amount. This predetermined amount may a relative difference between the post-FEC bit error rate and subsequent post-FEC bit error rate. Example values of this relative difference include four percent, five percent, and six percent, e.g. when the post-FEC BER is on the order of 0.001. The subsequent post-FEC bit error rate may be less than or equal to $10^{-12}$, e.g., when FEC decoder 960 implements either hard-decision LDPC FEC decoding or soft-decision LDPC FEC decoding.

Step 1090 includes decoding the subsequent equalized data stream (987($q$)) to yield a subsequent decoded data stream (989($q$)). The decoding of step 1090 may include implementing a low-density parity check code. When method 1000 includes step 1080, step 1090 may include quantizing the subsequent equalized data stream with the subsequent clipping level.

Figure 11:
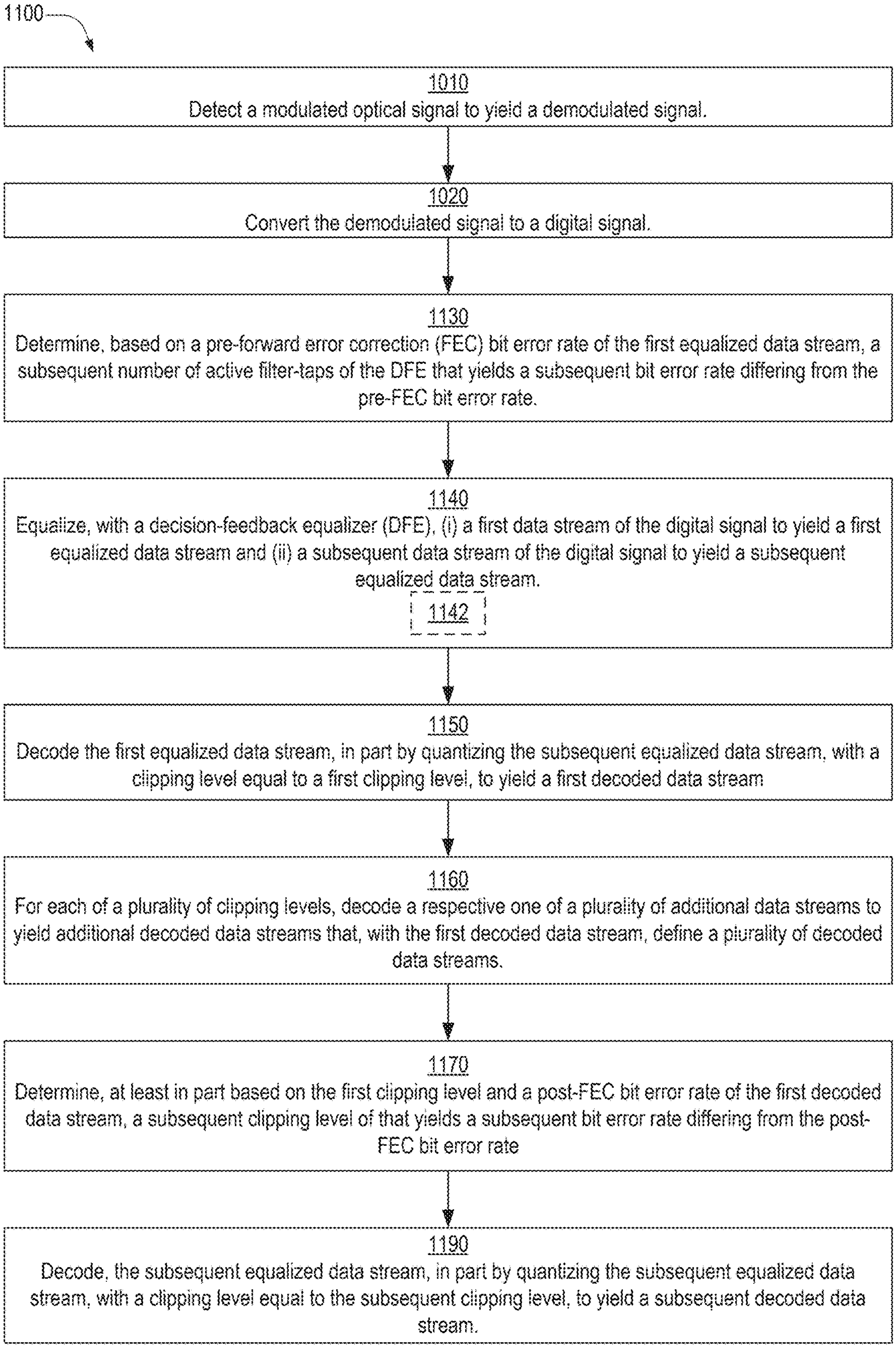

FIG. 11 is a flowchart illustrating a decoding optimization method 1100. In embodiments, method 1100 is implemented within one or more aspects of coherent receiver 900. For example, method 1100 may be implemented by DSP 901. Method 1100 includes at least one of steps 1010 and 1020 introduces in the description of method 1000. Method 1100 also includes at least one of steps 1130, 1140, 1150, 1160, 1170, and 1190. As in the description of method 1000, the following description of method 1100 includes parenthetical numbers following terms recited by the method.

Step 1130 includes determining, based on a pre-forward error correction (FEC) bit error rate of the first equalized data stream, a subsequent number of active filter-taps of the DFE that yields a subsequent bit error rate differing from the pre-FEC bit error rate.

Step 1140 includes equalizing, with a decision-feedback equalizer (DFE, 930), (i) a first data stream (984(1)) of the digital signal (983) to yield a first equalized data stream (987(1)) and (ii) a subsequent data stream (984($q$)) of the digital signal to yield a subsequent equalized data stream (987($q$)). When method 1100 includes step 1130, equalizing the subsequent data stream (step 1140) may include a step 1142. Step 1142 includes equalizing, with the DFE operating with the subsequent number of active filter-taps, the subsequent data stream to yield the subsequent equalized data stream.

Step 1150 includes decoding the first equalized data stream (987(1)), in part by quantizing the subsequent equalized data stream, with a clipping level equal to a first clipping level, to yield a first decoded data stream (989(1)).

In embodiments, method 1100 includes a step 1160, which precedes step 1170. Step 1160 includes, for each of a plurality of clipping levels, decoding a respective one of a plurality of additional data streams (984(2, 3, . . . )) to yield additional decoded data streams that, with the first decoded data stream, define a plurality of decoded data streams (989).

Step 1170 includes determining, at least in part based on the first clipping level and a post-FEC bit error rate of the first decoded data stream, a subsequent clipping level of that yields a subsequent bit error rate differing from the post-FEC bit error rate When method 1100 includes step 1160, step 1170 may include determining the subsequent clipping level based on (i) respective post-FEC bit error rates of the first decoded data stream and the additional decoded data streams (generated in step 1160) and (ii) the plurality of clipping levels.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments.

Regarding instances of the terms "and/or" and "at least one of," for example, in the cases of "A and/or B," "at least one of A and B," and "at least one of A or B," such phrasing encompasses the selection of (i) A only, or (ii) B only, or (iii) both A and B. In the cases of "A, B, and/or C," "at least one of A, B, and C," and "at least one of A, B, or C," such phrasing encompasses the selection of (i) A only, or (ii) B only, or (iii) C only, or (iv) A and B only, or (v) A and C only, or (vi) B and C only, or (vii) each of A and B and C. This may be extended for as many items as are listed.

The following claims are intended to cover all generic and specific features described herein, as well as all statements of the scope of the present method and system, which, as a matter of language, might be said to fall therebetween.

We claim:

1. A decoding optimization method comprising:

detecting a modulated optical signal to yield a demodulated signal;

converting the demodulated signal to a digital signal;

equalizing, with a decision-feedback equalizer (DFE) operating a first number of active filter-taps, a first data stream of the digital signal to yield a first equalized data stream;

determining, at least in part based on the first number of active filter-taps and a pre-forward error correction (FEC) bit error rate of the first equalized data stream, a subsequent number of active filter-taps of the DFE, the subsequent number differing from the first number that yields a subsequent pre-FEC bit error rate differing from the pre-FEC bit error rate;

changing the number of active filter-taps of the DFE to equal the subsequent number;

equalizing, with the DFE operating with the subsequent number of active filter-taps, a subsequent data stream of the digital signal to yield a subsequent equalized data stream; and decoding the subsequent equalized data stream to yield a subsequent decoded data stream.

2. The method of claim 1, the pre-FEC bit error rate exceeding the subsequent pre-FEC bit error rate by a predetermined amount.

3. The method of claim 1, further comprising:

decoding the first equalized data stream to yield a first decoded data stream; and determining, based on a post-FEC bit error rate of the first decoded data stream, a subsequent clipping level that yields a subsequent post-FEC bit error rate differing from the post-FEC bit error rate;

wherein said decoding the subsequent equalized data stream includes quantizing the subsequent equalized data stream with the subsequent clipping level.

4. The method of claim 3, the post-FEC bit error rate exceeding the subsequent post-FEC bit error rate by a predetermined amount.

5. The method of claim 1, said determining the subsequent number of filter-taps comprising:

monitoring the pre-forward error correction (FEC) bit error rate of the first equalized data stream.

6. The method of claim 1, determining the subsequent number of active filter-taps comprising: determining at least one of (i) a subsequent number of active feedback filters of the DFE and (ii) a subsequent number of active feedforward filters of the DFE.

7. The method of claim 1, further comprising, before equalizing the subsequent data stream, for each of a plurality of filter-tap counts, equalizing, with the DFE operating with a number of filter-taps equal to the filter-tap counts, a respective one of a plurality of additional data streams to yield a plurality of additional equalized data streams;

wherein said determining includes determining the subsequent number of filter-taps based on (i) respective pre-FEC bit error rates of the first equalized data stream and the additional equalized data streams, and (ii) the plurality of filter-tap counts.

8. The method of claim 7, said determining comprising implementing an optimization algorithm having, as input, the respective pre-FEC bit error rates and the plurality of filter-tap counts.

9. The method of claim 1, said changing comprising changing a tap coefficient of a filter-tap of the DFE from either (i) zero to a non-zero value or (ii) a non-zero value to zero.

10. The method of claim 1, said decoding including implementing a low-density parity check code.

11. A decoding optimization method comprising:

detecting a modulated optical signal to yield a demodulated signal;

converting the demodulated signal to a digital signal;

equalizing, with a decision-feedback equalizer (DFE), (i) a first data stream of the digital signal to yield a first equalized data stream and (ii) a subsequent data stream of the digital signal to yield a subsequent equalized data stream;

decoding the first equalized data stream, in part by quantizing the subsequent equalized data stream, with a clipping level equal to a first clipping level, to yield a first decoded data stream;

determining, at least in part based on the first clipping level and a post-FEC bit error rate of the first decoded data stream, a subsequent clipping level of that yields a subsequent bit error rate differing from the post-FEC bit error rate; and decoding the subsequent equalized data stream, in part by quantizing the subsequent equalized data stream, with a clipping level equal to the subsequent clipping level, to yield a subsequent decoded data stream.

12. The method of claim 11, further comprising:

determining, based on a pre-forward error correction (FEC) bit error rate of the first equalized data stream, a subsequent number of active filter-taps of the DFE that yields a subsequent bit error rate differing from the pre-FEC bit error rate;

wherein said equalizing the subsequent data stream (1140) includes equalizing, with the DFE operating with the subsequent number of active filter-taps, the subsequent data stream to yield the subsequent equalized data stream.

13. The method of claim 11, further comprising, before decoding the subsequent equalized data stream:

for each of a plurality of clipping levels, decoding a respective one of a plurality of additional data streams to yield additional decoded data streams that, with the first decoded data stream, define a plurality of decoded data streams;

wherein said determining including determining the subsequent clipping level based on (i) respective post-FEC bit error rates of the first decoded data stream and the additional decoded data streams and (ii) the plurality of clipping levels.

14. The method of claim 13, said determining comprising implementing an optimization algorithm having, as inputs, the respective post-FEC bit error rates and the plurality of clipping levels.

15. A signal processor comprising:

a decision-feedback equalizer (DFE) that equalizes a first data stream of a digital signal to yield a first equalized data stream;

a DFE optimizer, communicatively coupled to the DFE, that determines, based on a pre-forward error correction (FEC) bit error rate of the first equalized data stream, a subsequent number of active filter-taps of the DFE that yields a subsequent bit error rate differing from the pre-FEC bit error rate;

wherein the DFE, when operating with the subsequent number of active filter-taps, equalizes a subsequent data stream of the digital signal to yield a subsequent equalized data stream; and an FEC decoder, communicatively coupled to the DFE, that;

(i) decodes the first equalized data stream to yield a first decoded data stream, (ii) determines, based on a post-FEC bit error rate of the first decoded data stream, a subsequent clipping level that yields a subsequent post-FEC bit error rate differing from the post-FEC bit error rate; and (iii) decodes the subsequent equalized data stream, in part by quantizing the subsequent equalized data stream with the subsequent clipping level, to yield a subsequent decoded data stream.

16. The signal processor of claim 15, the FEC decoder being a low-density parity check decoder.

* * * * *